Patented June 7, 1938

2,119,624

UNITED STATES PATENT OFFICE 2,119,624

FURNACE

Ralph M. Hardgrove, Westfield, N. J., assignor to The Babcock & Wilcox Company, Newark, N. J., a corporation of New Jersey Application December 20, 1934, Serial No. 758,384

4 Claims. (Cl. 110—28)

My invention relates to furnaces wherein a slag-forming fuel is burned in suspension and particularly to a furnace of this type wherein the solid residues of combustion are removed in molten form.

Furnaces of the above type are commonly referred to as slag-tap furnaces and the advantages incident to their use are well known. These furnaces usually comprise a plurality of upwardly-extending side walls defining a combustion chamber and a bottom wall extending transversely beneath the combustion chamber and constructed to sustain a pool of molten slag. A slag-forming fuel, for example, pulverized coal, is fed into the combustion chamber by suitable burners, and the coal is burned in suspension therein. Non-combustible solids in the fuel are collected in a molten form in the slag pool and the slag may be tapped from the pool either intermittently or continuously, through a suitable opening provided for such purpose.

It is an object of the present invention to provide an improved method or process of burning fuel in a slag-tap furnace whereby a more economical operation of the furnace is made possible and whereby operating difficulties incident to the burning of pulverized fuel containing metal-sulphur compounds and iron compounds are minimized.

A further object of the invention is to provide a slag-tap furnace which is of improved construction and of improved arrangement of parts.

The above and other objects are effected by my invention as will be apparent from an examination of the following description, and claims when taken in connection with the accompanying drawings, in which:

Figure 1:
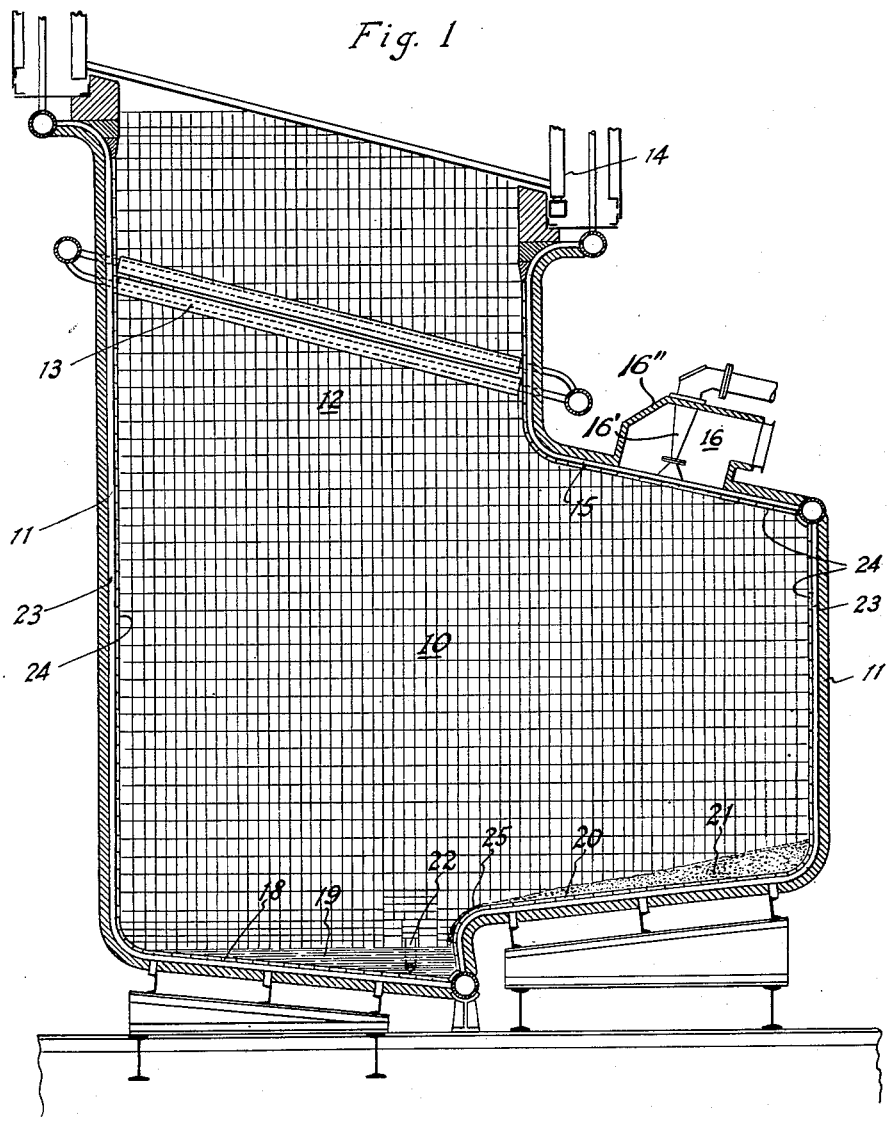
Fig. 1 is a vertical sectional view through a furnace constructed in accordance with the present invention.

Certain of the slag-forming fuels available for use in pulverized fuel furnaces contain metal-sulphur compounds, the commonest of which is probably pyrite or iron disulphide ($FeS_2$); and considerable difficulty has been experienced in burning fuels of this character because of the highly destructive action on the furnace surfaces of the metal sulphides which form in the furnace. For the purpose of explanation, it may be noted that, iron disulphide ($FeS_2$) readily breaks down at relatively low furnace temperatures into iron sulphide (FeS) which is a relatively stable compound having a relatively high specific gravity, high specific heat, and a high heat conductivity characteristic. The iron sulphide is molten at around 1700° F., and, at ordinary furnace temperatures, for example, 2500° F., the viscosity is very low with consequent high penetrating qualities. On account of its relatively high specific gravity, the iron sulphide settles to the bottom of the slag pool; and, as it is a liquid having a low viscosity, it readily penetrates any cracks or crevices in the furnace bottom, and its deposition therein is considered largely responsible for the objectionable increase in size or growth of furnace bottoms constructed to sustain slag pools. As iron sulphide has such a relatively high specific heat and a high heat conductivity characteristic, it will destroy furnace surfaces if permitted to flow while in contact therewith. The molten sulphide has been known to erode steel tubes through which water was flowing.

I have found that, in the pulverizing of slag-forming fuels containing metal-sulphur compounds, for example, the iron disulphide or pyrite, just mentioned, most of the compound is found in the larger particles of the pulverized fuel. This is believed to be due to the relatively low grindability characteristic of the metal-sulphur compound.

According to one aspect of my invention I obviate the difficulties incident to the burning of a slag-forming fuel containing metal-sulphur compounds by separating out of the fuel stream the larger particles of fuel, which, as stated, contain the major portion of the objectional metal-sulphur compounds, in collecting these particles at a point away from the slag pool, and in subjecting the collected particles to an oxidizing action, whereby the carbon, iron and sulphur contents of the particles are oxidized, the carbon and sulphur changing to gases and the iron to iron oxide which is in a molten form and flows into the slag pool with the remaining molten non-combustible residue of the fuel. By oxidizing action, I mean that the particles are subjected to the relatively high temperature of the burning fuel stream and are swept by the stream which contains an ample supply of oxygen, the latter combining with the carbon, sulphur and iron in the manner just explained.

In addition to the fact that my improved process explained above reduces the presence of sulphides in the slag pool to a minimum, it also prevents, at least to a large degree, the presence of pure iron in the slag, which is also objectionable. According to the prior arrangements, particles of fuel containing an iron compound or iron disulphide sometimes collect in piles on the slag pool or on other parts of the furnace away from the fuel-burning stream, thereby preventing the free access of oxygen to the particles, and this results in a reducing action taking place and in the carbon present in the particles combining with the oxygen of any iron oxide present, thereby leaving pure iron. Such is not true of my process as the fuel stream supplies ample oxygen for the carbon present, and the iron oxide in molten form flows into the slag pool.

In accordance with another aspect of my invention, the above described method steps consisting of separating out of the fuel stream the larger particles of fuel, of collecting the particles at a point in the furnace away from the slag pool, and of oxidizing or burning the collected particles, may also be used to advantage in slag-tap furnaces wherein fuels are burned which contain no objectionable metal-sulphur or iron compound. For example, a relatively coarser pulverized fuel can be burned efficiently when these method steps are used, than can be burned according to the prior art methods. It is well known that with any particular type of pulverizing apparatus and any type of fuel, the cost of pulverizing increases with the degree of fineness of the finished product. Hence, as my method makes possible the efficient burning of a relatively coarser fuel, it is more economical to operate a furnace according to my method.

Referring in detail to Fig. 1 of the drawings, the reference numeral 10 indicates a combustion chamber which is defined by upright side walls 11 and is provided at one side of the upper portion thereof with a gas outlet 12. A water cooled furnace slag screen 13 may be provided across the outlet 12 and a suitable boiler 14 above the outlet. An arch extension or roof portion 15 covers the combustion chamber at the side opposite the outlet 12 and a burner means 16 is provided in the roof portion for introducing, more or less vertically downward into the combustion chamber, a stream of relatively coarse pulverized fuel or a pulverized fuel containing a metal-sulphur or iron compound, along with ample oxygen bearing air for supporting combustion of the fuel. The pulverized-fuel in suspension in a stream of primary combustion air is introduced through burner nozzles 16', while secondary combustion air is introduced through an air box 16" surrounding the nozzles 16'. The use of a turbulent type of burner such as is shown at 16 along with preheated air, induces rapid combustion of the fine combustibles at high temperatures.

A bottom 17 is disposed across the lower portion of the combustion chamber 10 and is divided into a portion 18 constructed to sustain a pool of molten slag indicated at 19, and a ledge portion 20 slightly above and at one side of the slag pool and beneath the roof portion 15 and the burner means 16, the ledge portion 20 being slightly inclined toward the portion 18 to permit the gravitation of the molten residues to the portion 18.

The structure so far described provides for establishing a U-shaped flow path for pulverized fuel undergoing combustion, the stream flowing downward from the burner 16 and then sidewise over the ledge portion 20 and portion 18 and then upwardly through the outlet 12.

The change in direction of flow of the fuel stream from downward to sidewise over the ledge portion 20 will result in the separating out of the stream of the larger particles, and the larger particles will collect on the ledge portion as indicated at 21 where they are subjected to the intense heat of combustion of the fuel in the stream. The particles are swept by the burning stream and as the latter contains an ample supply of oxygen, the collected particles will be burned or oxidized and the molten residue of this combustion will gravitate to the portion 18 of the bottom which is constructed to sustain the slag pool indicated at 19.

The fuel which is not separated out of the stream on to the ledge 20, is burned in suspension in the furnace chamber in the well known manner. A portion of the solid non-combustibles in the fuel burning in suspension drops to the bottom by their own weight. Other non-combustibles are caught on the wall surfaces of the furnace and run down the wall surfaces and collect in the slag pool 19. A suitable opening 22 is provided through a side wall 11 for removing the slag from the furnace either periodically or continuously as desired.

By reason of the furnace construction and operation thereof thus far described, a relatively coarser pulverized fuel can be burned, the larger particles settling out of the stream onto the ledge 20 and being completely burned thereon due to the position of the ledge with respect to the flow path of the stream of burning fuel.

The walls, roof portion, and furnace bottom may be formed of spaced water tubes 23 with suitable means, for example, blocks 24 for closing the spaces between tubes. The water tubes 23 may be connected into the boiler circulation system so as to provide for the circulation of cooling water therethrough. Walls constructed in this manner effectively withstand the destructive action of the molten ash or slag flowing thereover.

The water cooling of the ledge portion 20 is of particular advantage, because of the amount and character of the molten residue flowing thereover; and this is especially true of the extreme lower end, indicated at 25, where almost all of the residue in contact therewith will be molten and of comparatively little depth. It may be that, in operation sulphides will form and be present in the molten residue or slag as it approaches the lower end 25. The thinning out of the stream as it passes over the portion 25 will result in a still further increase in temperature of the slag and better exposure to the oxygen available in the burning fuel stream and as a consequence, will provide better conditions for breaking down and oxidizing the sulphur content of sulphides in the slag.

The tubes forming the slag screen 13 and the roof portion 15 are sloped toward the ledge portion 20 so that should any sulphides form in the fuel stream and collect on these surfaces they will gravitate toward the ledge portion where they will be oxidized before reaching the slag pool 19.

Figure 2:
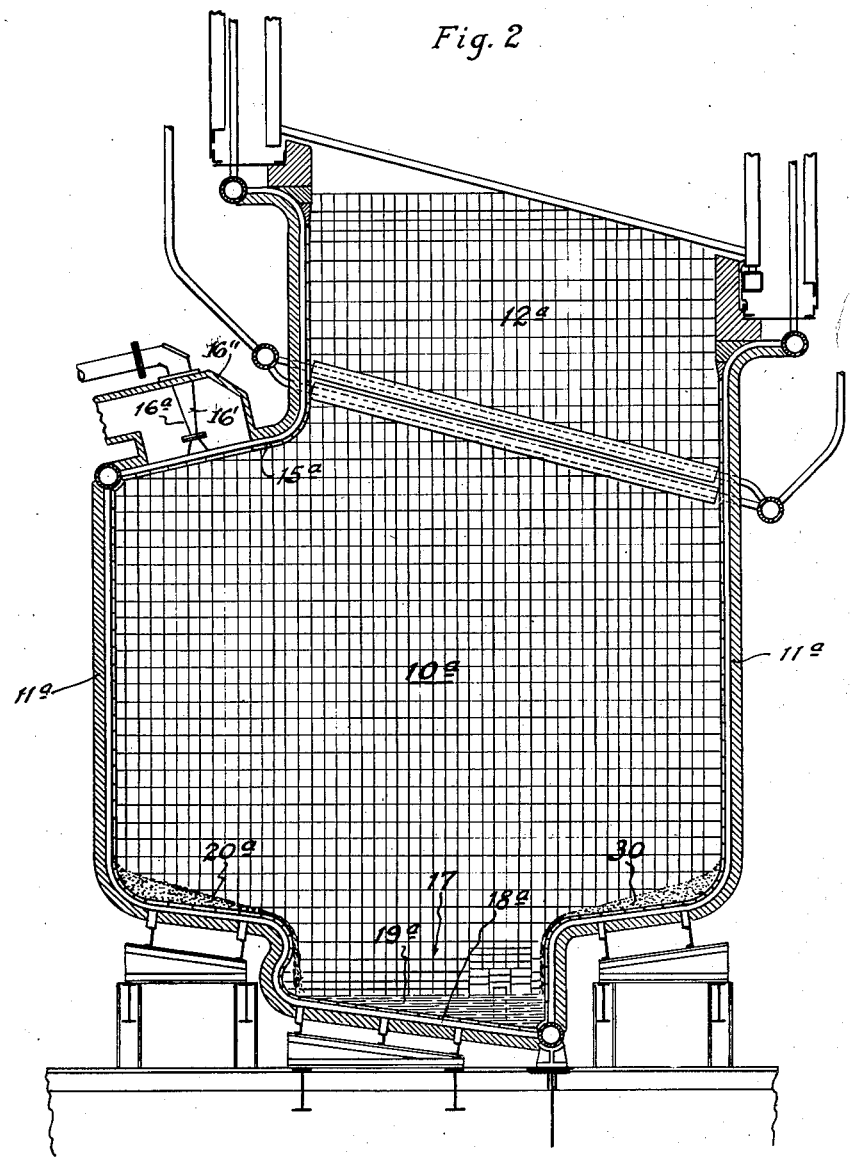
Fig. 2 is a view similar to Fig. 1, illustrating a slightly modified form of my invention.

Referring now to Fig. 2 of the drawings it will be observed that I have shown my invention in a slightly modified form. The combustion chamber 10a is defined by side walls 11a and is provided with an outlet opening 12a in the upper portion and at one side thereof, and with a roof portion 15a at the side opposite the outlet 12a. A burner means 16a serves to introduce into the combustion chamber a stream of relatively coarse pulverized fuel or pulverized fuel containing a metal-sulphur compound or an iron compound.

As in the previously described modification, the stream of fuel is introduced downwardly into the combustion chamber in a more or less vertical direction and the stream follows a U-shaped flow path and leaves the combustion chamber through the outlet 12a.

In Fig. 2, I have shown two ledge portions 20a and 30, respectively, instead of the single ledge portion 20 of the previously described modification. The ledge portions 20a and 30 are arranged at opposite sides of a central depressed portion 18a which is constructed to sustain a pool of molten slag indicated at 19a. The purpose of the ledge portions 20a and 30 is the same as that of the ledge portion 20 of the previously described modification, i. e., the ledge portions 20a and 30 are provided for the purpose of retaining the larger particles of fuel which are separated out of the fuel-bearing stream by change in direction of flow thereof.

The ledge portion 20a is disposed beneath that portion of the furnace where the change in direction of flow of the fuel-bearing stream is from downward to sidewise, and the ledge portion 30 is beneath that portion of the furnace where the change in direction of flow of the fuel-bearing stream is from sidewise to upward. Hence, the large particles of fuel which may contain the metal-sulphur compound, settle out of the fuel-bearing stream and collect on the ledge portions 20a and 30. Due to the heat of combustion and exposure to oxygen in the stream, the metal-sulphur compound present in the collected particles of fuel on the ledge portions is broken down and the sulphur content thereof oxidized in the same manner as in the previously described modification.

From the above, it will be apparent that I have provided a furnace which is of improved construction and arrangement of parts and a new method of burning fuel in pulverized fuel slag-tap furnaces, whereby all of the advantages incident to the collection and removal of ash in molten form are derived, and at the same time all of the disadvantages due to the inability to completely burn out the combustible in the larger fuel particles and due to the presence of sulphides and/or pure iron in the molten residue, are eliminated. These advantages are possible by the provision of the ledge portion or ledge portions in the furnace at points where the stream of burning fuel changes its direction whereby the larger fuel particles are collected and subjected to the oxidizing action of the burning fuel stream, the oxidizing action being a result of the high temperature condition in the presence of ample oxygen.

While I have shown my invention in only two forms, it will be obvious to those skilled in the art that it is not so limited but is susceptible of various other changes and modifications without departing from the spirit thereof, and I desire therefore, that only such limitations shall be placed thereupon as are imposed by the prior art or as are specifically set forth in the appended claims.

I claim:—

1. The method of burning pulverized fuel at temperatures above the fusion temperature of the slag-forming constituents of the fuel which comprises introducing the fuel and combustion air into a high temperature furnace chamber in a stream directed to pass through a flow path in the furnace chamber including a change in direction sufficient to cause coarse fuel particles to separate from the fuel stream and burning the fuel in suspension at furnace temperatures above the fusion temperature of the slag-forming constituents of the fuel, collecting slag particles separating from the fuel burning in suspension and maintaining a layer of slag in a molten condition in the furnace chamber, collecting the coarse fuel particles separated from the fuel stream in the furnace chamber separate from the layer of molten slag and out of the main flow path of the fuel stream, and utilizing a portion of the air introduced to effect oxidation of the separated fuel particles.

2. The method of burning pulverized fuel containing a relatively high percentage of pyrites at temperatures above the fusion temperature of the non-combustible constituents of the fuel which comprises introducing the fuel and combustion air into a high temperature furnace chamber in a stream directed to pass through a flow path in the furnace chamber including a change in direction sufficient to cause fuel particles containing pyrites to separate from the fuel stream and burning the fuel in suspension at furnace temperatures above the fusion temperature of the non-combustible constituents of the fuel, collecting slag particles separated from the fuel burning in suspension and maintaining a layer of slag in a molten condition in the furnace chamber, collecting the fuel particles separated from the fuel stream in the furnace chamber separate from the layer of molten slag and out of the main flow path of the fuel stream, and utilizing a portion of the air introduced to effect oxidation of the iron and sulphur constituents of the separated fuel particles.

3. The method of burning pulverized fuel containing a relatively high percentage of pyrites at temperatures above the fusion temperature of the non-combustible constituents of the fuel which comprises introducing the fuel and combustion air into a high temperature furnace chamber in a downwardly directed stream passing through a U-shaped flow path in the furnace chamber having a change in direction sufficient to cause fuel particles containing pyrites to separate from the fuel stream and burning the fuel in suspension at furnace temperatures above the fusion temperature of the non-combustible constituents of the fuel, collecting slag particles separated from the fuel burning in suspension and maintaining a layer of slag in a molten condition in the furnace chamber, collecting the fuel particles separated from the fuel stream in the furnace chamber separate from the layer of molten slag and out of the main flow path of the fuel stream, utilizing a portion of the air introduced to effect oxidation of the iron and sulphur constituents of the separated fuel particles, and conducting the molten residue of the separated fuel particles to the layer of molten slag.

4. The method of burning pulverized fuel containing a relatively high percentage of a metal-sulphur compound in a furnace chamber at furnace temperatures above the fusion temperature of the non-combustible constituents of the fuel which comprises discharging a stream of the fuel and air for combustion into the furnace chamber and burning the fuel in suspension while in a flow path having a change in direction sufficient to cause fuel particles containing the metal-sulphur compound to separate from the burning fuel stream and deposit in said furnace chamber in a position out of said flow path, utilizing a portion of the air introduced to effect oxidation of the metal and sulphur constituents of the separated fuel particles, maintaining a pool of molten slag separated from the burning fuel stream separate from the deposited fuel particles and in a position to receive molten residue of the deposited fuel particles, and withdrawing slag from said pool in a molten condition.

RALPH M. HARDGROVE.